Jan. 28, 1964   W. H. FISK ETAL   3,119,419
BOARD HANDLING APPARATUS
Filed Oct. 20, 1961   4 Sheets-Sheet 1

INVENTORS
WOOSTER HAYDEN FISK
LEONARD K. FLOAN
GLENN E. GAGE
BY
Wells & St. John
ATTYS.

Jan. 28, 1964 W. H. FISK ETAL 3,119,419
BOARD HANDLING APPARATUS
Filed Oct. 20, 1961 4 Sheets-Sheet 2
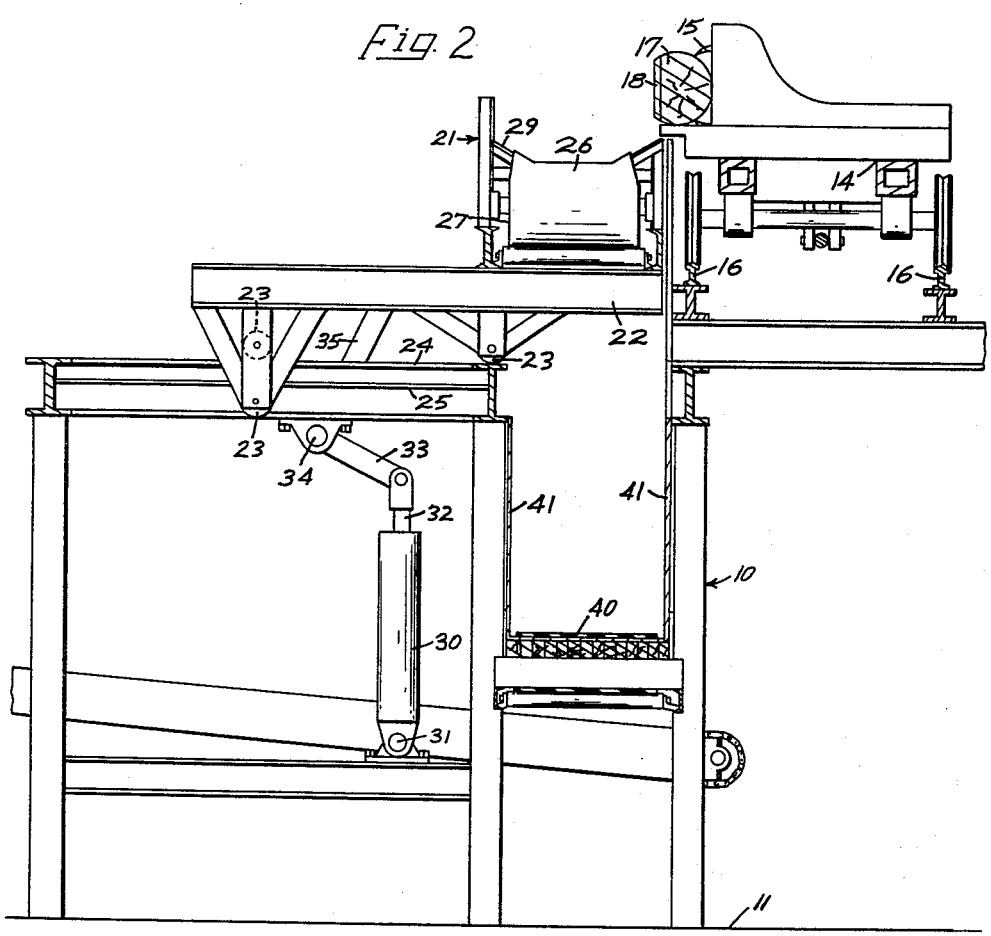
Fig. 2
Fig. 3
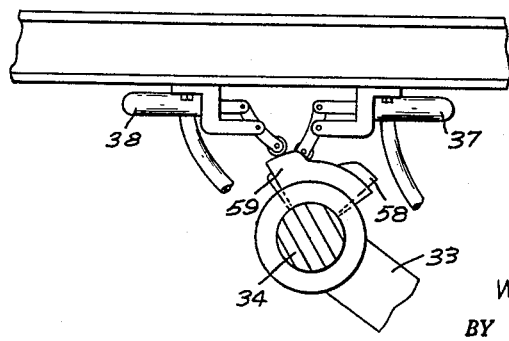
INVENTORS
WOOSTER HAYDEN FISK
LEONARD K. FLOAN
BY GLENN E. GAGE
*Wells & St. John*
ATTYS.

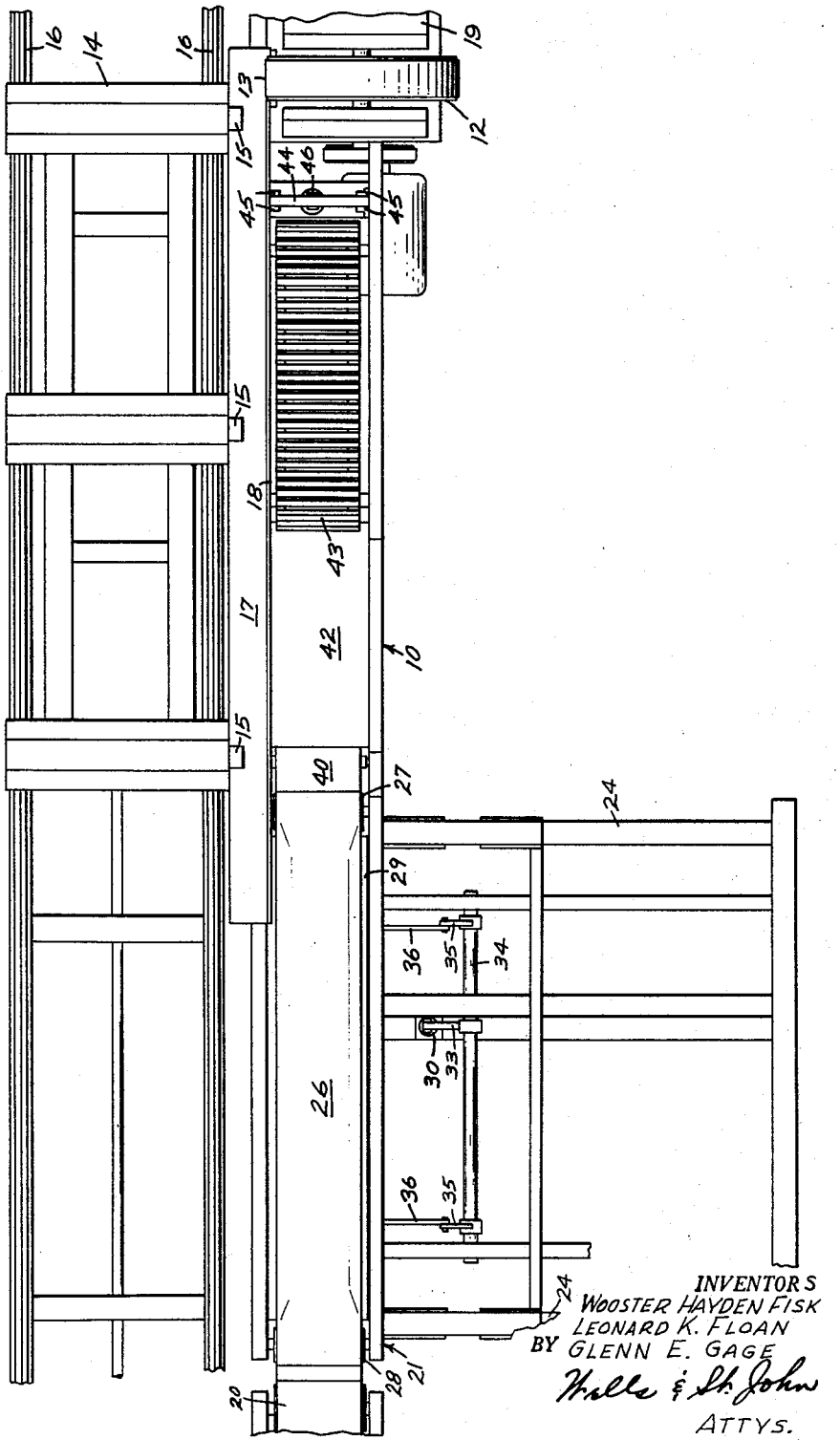

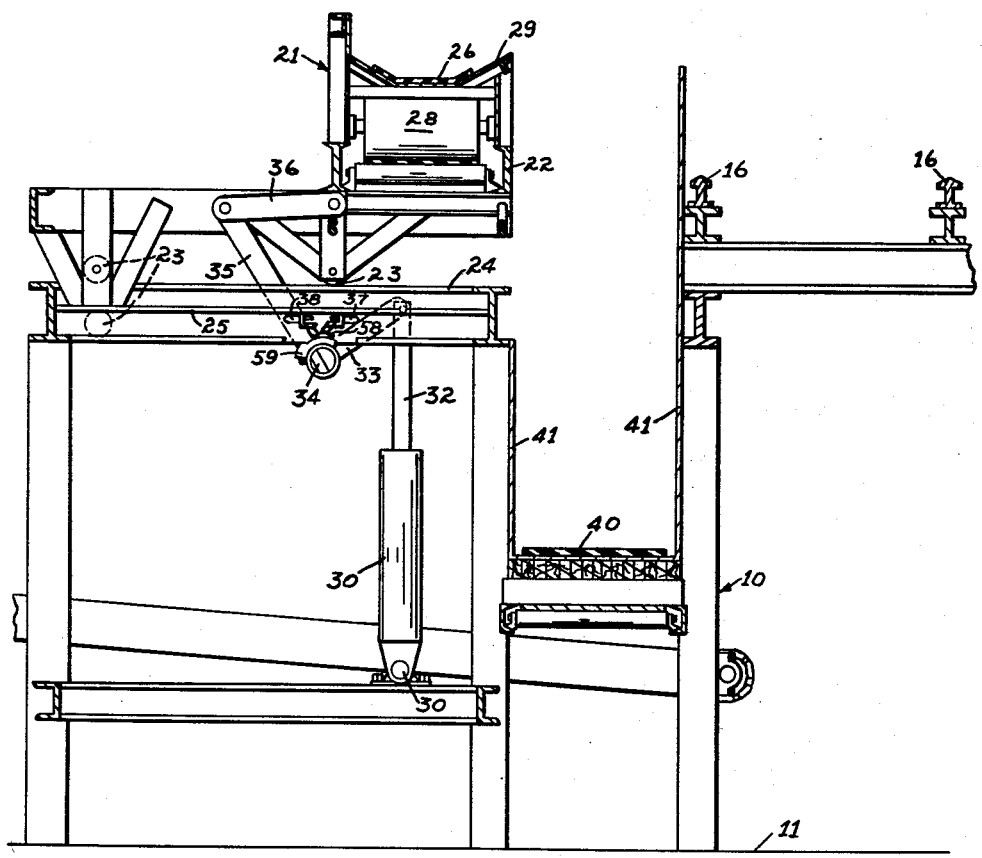
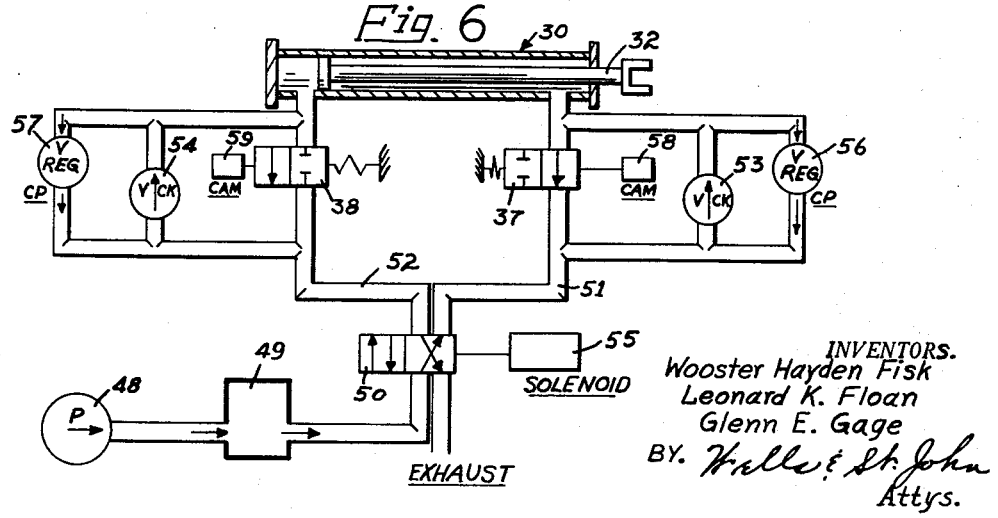

United States Patent Office 3,119,419
Patented Jan. 28, 1964

3,119,419
BOARD HANDLING APPARATUS
Wooster Hayden Fisk, Clarkston, Wash., and Leonard K. Floan and Glenn E. Gage, Lewiston, Idaho, assignors to Potlatch Forests, Inc., Lewiston, Idaho, a corporation of Delaware
Filed Oct. 20, 1961, Ser. No. 146,463
6 Claims. (Cl. 143—157)

This invention relates to a novel conveyor apparatus for handling boards as they are cut in a lumber mill.

Present practice in lumber mills requires the use of manual labor to separate the slabs and boards or cants as they are cut by a saw from a log carrying carriage. The boards or cants must be transferred for further processing, while the slabs are conveyed by a trash conveyor to a chipper or other processing apparatus. Such manual separation is accomplished by a "tail sawyer" who is stationed adjacent the vertical saw. The slabs have been allowed to proceed down the rollcase to be dropped on slasher chains. The "tail sawyer" must turn the slabs face down for travel on the rollcase and must monitor the passage of "fishtails"—short triangular slabs cut from flared butt logs. This manual operation is viewed by the industry as involving personal hazard due to the proximity of the individual to the vertical saw and the danger of splinters, broken saw teeth and broken band saws. At any rate, personal conditions are disagreeable due to flying sawdust.

It is a first object of this invention to provide an integrated conveyor system to handle cut boards and slabs and to effect this necessary manual separation without requiring manual handling of the materials. In order to accomplish this object, it is first necessary to provide a separating conveyor network to remove the slabs before entry onto the rollcase, thus eliminating the necessity of turning them flat side down.

It is another object of this invention to provide for automatic disposal of short slabs without intervention by the sawyer or any other person. This is accomplished by use of a short slat bed conveyor at the outfeed end of the saw, which delivers to a spaced transfer conveyor. All short materials are allowed to fall through this spacing to a waste conveyor system.

Another object of the invention is to hold a board that has been cut on the back cut of a double cut bandsaw from motion down the rollcase. This holding action, formerly a manual operation, is carried out by a simple mechanical stop under the control of a remote operator.

In brief, the present invention is designed to accomplish the purposes of a human "tail sawyer" by remote operation of a novel conveyor apparatus. The entire apparatus may be controlled by the sawyer, who can then integrate its actions with the operation of the carriage on which the logs are mounted for cutting purposes.

These and further objects will be evident from the following disclosure, which describes one form of the invention, shown in the accompanying set of drawings. This exemplary arrangement is for illustrative purposes only and is not intended to limit or restrict the scope of the invention as it is defined in the claims which follow.

In the drawings:

FIGURE 2 is a vertical sectional view taken through line 2—2 in FIGURE 1;

FIGURE 3 is an enlarged fragmentary view taken through line 3—3 in FIGURE 1;

FIGURE 4 is a top plan view of the assembly shown in FIGURE 1;

FIGURE 5 is a vertical sectional view taken through line 5—5 in FIGURE 1, the transfer conveyor being shown in its alternate position; and FIGURE 6 is a diagrammatic view of the control system used to move the transfer conveyor.

Figure 1:
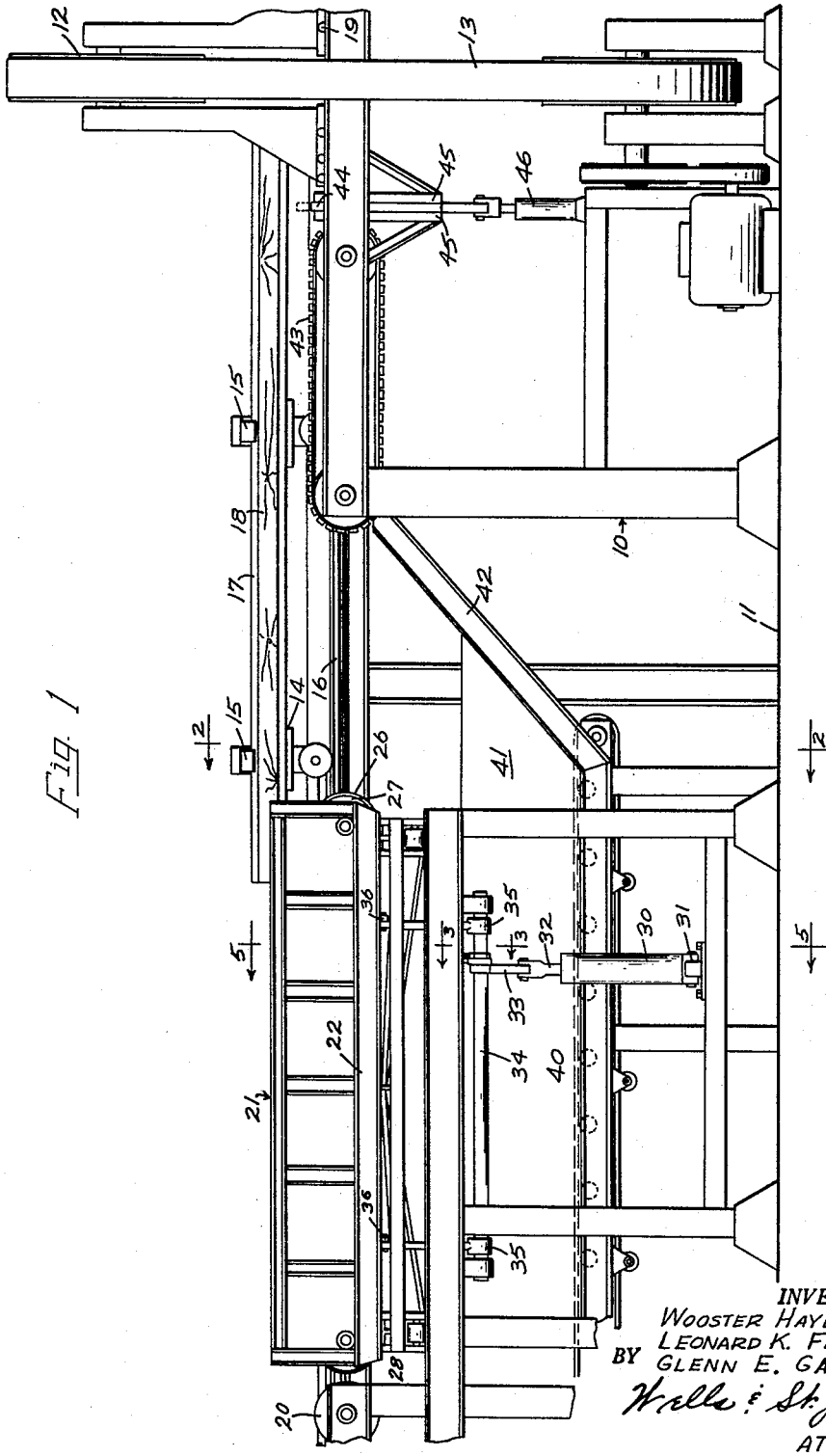
FIGURE 1 is a side view taken along a sawmill in the area adjacent the outfeed end of a band mill.

The drawings illustrate a preferred embodiment of the board handling apparatus designed to replace the manual "tail sawyer." The invention is designed for adaptation in a conventional mill and therefore only those areas affected by changes are illustrated in the drawings.

Basically, a fixed supporting framework 10 is erected on the mill floor 11. Mounted on this framework is a vertical band saw 12 having a double edged cutting blade 13. It is to be noted at the outset, that the type of saw used herein is not controlling—the basic features of the invention are equally applicable to single edge band saws or to vertical circular saws.

A conventional carriage 14 with a suitable carriage setworks and log engaging dogs 15 is provided for reciprocable motion along a pair of spaced rails 16. The carriage is adapted to propel a log 17 past one cutting edge of saw 12 to thereby cut off a board 18. The initial cut on a log 17 produces a slab. This slab is processed apart from the usable boards 18 and is separated by the following interrelated elements.

Adjacent the blade 13 and longitudinally aligned therewith is a rollcase 19 adapted to support cut boards 17 produced by the back stroke of carriage 14. Longitudinally spaced from blade 13 is an outfeed rollcase 20 of conventional design. The outfeed rollcase 20 is located at a horizontal elevation slightly below that of a log in carriage 14, as is also the rollcase 19. Each of these rollcases 19 and 20 has a top roller surface directed identically toward the left as shown in FIGURE 1.

Located intermediate the infeed end of conveyor 20 and the saw 12 is a movable transfer conveyor 21. The conveyor 21 comprises a rigid rectangular frame 22 supported on wheels 23 by an upper pair of tracks 24 and a lower pair of tracks 25. As can be seen in the drawings, the frame 22 is partially cantilevered and extends outwardly from wheels 23. At this location is mounted a belt conveyor 26 which is mounted about longitudinally spaced rollers 27 and 28. The rear roller 28 is driven by means not shown, so as to move the upper surface of conveyor 26 in the same longitudinal direction as the top surfaces of conveyors 19 and 20. Adjacent the upper surface of conveyor 26 and extending along its length are guides 29 which form the transverse section of the conveyor flight so as to maintain boards on the belt itself. It is to be noted that the length of conveyor 26 need not be long and is preferably shorter than that of the logs 17 being processed.

The conveyor 26 is moved between the two positions shown in FIGURES 2 and 5 by means of a cylinder assembly 30 pivoted to framework 10 at 31. The piston rod 32 is pivotally connected to a bell crank 33 extending radially outward from a pivot shaft 34 mounted longitudinally on framework 10. Spaced along shaft 34 and fixed thereto are a pair of arms 35 which connect with pivot links 36 mounted on the movable frame 22. As can be seen in FIGURE 5, expansion or contraction of the cylinder assembly 30 will result in motion of the conveyor 26 to the left or right in a direction transverse to its length. The cylinder assembly 30 is preferably a double acting assembly.

The controls used to position transfer conveyor 26 are illustrated in FIGURES 3 and 6. The pneumatic system illustrated is merely one example of a suitable control, using common components. Mechanical or hydraulic systems may be substituted if desired.

A pump 48 is driven by conventional means (not shown) and supplies air to a suitable accumulator 49. The air supply is directed by a distributing valve 50, which alternately connects the air source to one or the other of two branched supply lines 51, 52, leading to check valves 53, 54 respectively. The two check valves 53, 54 are connected to opposite ends of cylinder assembly 30 and prevent passage of air through the valves 53, 54 back to the air source. The distributing valve 50 is positioned by a common solenoid control 55, which may be under the operational direction of the sawyer.

The branched lines 51, 52 are also provided with constant flow outlet valves 56, 57 leading from the respective connections to cylinder assembly 30. Lines 51, 52 also include normally open valves 37, 38 which are mounted on the supporting framework 10 and which are selectively activated by cams 58, 59, fixed to shaft 34. The valves 37, 38 serve to aid in the deceleration of the large moving mass of conveyor 26 at its limits of motion. This is accomplished by the closing of one valve 37, 38, thereby restricting the flow of exhaust air to one of the restrictive valves 56 or 57.

A waste conveyor 40 is provided beneath the conveyor 20 and extending toward saw 12. This waste conveyor is shown as a belt conveyor, but may be of any suitable design. It extends beneath the transfer conveyor 26 when in the position shown in FIGURE 2. Conveyor 40 is located in a channel enclosed by plates 41 to thereby prevent the passage of sawdust and small boards into the adjoining mill areas. A chute 42 extends angularly downward to the infeed end of conveyor 40. The conveyor 40 extends longitudinally to a drop off point where waste materials are dropped to a slasher deck or other suitable conveying mechanism.

A short slat bed conveyor 43 is provided in elevational and longitudinal alignment with the two roll conveyors 19 and 20. The length of conveyor 43 is quite short compared to the length of logs 17. Its purpose is to insure delivery of short slabs, pieces of boards and "fish tails" to the chute 42 and therefore to the waste conveyor 20. For this reason, a short open space is required between the left hand end of conveyor 43 and the infeed end of transfer conveyor 26 as can be seen in FIGURE 1.

A vertically movable stop 44 is provided on framework 10 intermediate saw 12 and the infeed end of conveyor 43 (see FIGURES 1 and 4). The stop 44 is slidable between guides 45 by means of a cylinder 46. Cylinder 46 is also preferably under the selective control of the sawyer operating carriage 14.

*Operation*

The operation of a sawmill equipped with the instant invention parallels the present manual practice. The logs mounted on carriage 14 are reciprocated past the double edged blade 13, producing a cut board or slab on each pass of carriage 14. During a pass to the left, as viewed in FIGURES 1 and 4, a cut slab can be directed over conveyor 43 and onto the waste conveyor 40 by retraction of the transfer conveyor 21 to the alternate position shown in FIGURE 5. If a finished board is being cut on this pass, the conveyor 21 will be retained in the first position shown in FIGURE 2. The long board will then bridge the gap separating conveyors 43 and 21 and will be carried by rollcase 20 to an edger or other processing facility. Should a short slab be cut on such a pass, it will fall to the waste conveyor 40 through the relatively short gap separating conveyors 43 and 21 and retraction of conveyor 21 will be unnecessary.

During the return stroke of carriage 14, to the right as viewed in FIGURES 1 and 4, another board or slab will be cut from the log in the case of a mill utilizing a double edged band saw 12. This board or slab will fall upon the rollcase 19 and may proceed directly to conveyor 43 or be stopped temporarily by the stop 44. The stop 44 is used to prevent transfer of finished boards to conveyor 43 while the transfer conveyor 21 is retracted. For this purpose, control of stop 44 may be interlocked with the controls for conveyor 21. The stop 44 may also be used to selectively separate boards when they overlap one another. In other instances, boards being directed to the same location may be held by a stop 44 and fed to conveyor 43 in pairs.

Various portions of this integrated unit may be utilized independently of one another, dependent upon mill design. In a single cut mill, the use of stop 44 may be optional, dependent upon separation requirements. The trash conveyor system may be changed to any desired design without affecting the operation of the system. The slat bed conveyor 43 may be eliminated and a short gap to conveyor 21 alone will serve to separate short boards in some installations.

Since many changes can be utilized in conjunction with this invention, the following claims alone are intended to limit and define the scope of the invention.

Having thus described our invention, we claim:
1. In a board handling assembly having:
  a supporting framework;
  a saw mounted on said framework including a cutting edge located in a vertical plane;
  a carriage positioned on said framework for reciprocable motion across the cutting edge of said saw, said carriage being provided with log gripping elements adapted to position a log for cutting engagement with the saw edge during reciprocation of said carriage;
  outfeed conveyor means located on said framework immediately the elevation of said carriage in longitudinal alignment with the saw cutting edge adapted to receive cut boards, the infeed end of said conveyor being longitudinally displaced from said saw;
  and a waste conveyor located on said framework at an elevation below that of said outfeed conveyor means and in vertical alignment with said saw the improvement comprising:
  a transfer conveyor movably mounted on the framework for movement between a first position wherein it extends horizontally outward of the infeed end of the outfeed conveyor means toward the saw in longitudinal alignment therewith, to a second position wherein it maintains the separation of the saw and the receiving conveyor means without interference, the direction of motion of the supporting surface of the transfer conveyor when in said first position being identical to that of the outfeed conveyor means;
  and means on said framework operatively connected to said transfer conveyor adapted to effect motion thereof between said first and second positions.
2. The device as defined in claim 1 wherein said transfer conveyor comprises:
  a conveyor frame movably mounted on said framework for motion transverse to the direction of motion of said carriage;
  a board supporting conveyor mounted on said frame in a longitudinal position parallel to said outfeed conveyor means;
  and wherein said last named means comprises an expansible cylinder assembly operatively connected to said framework and said frame.
3. The device as defined in claim 1 further comprising:
  a horizontal conveyor located adjacent said saw having an outfeed end longitudinally spaced from said transfer conveyor, said horizontal conveyor being longitudinally and elevationally aligned with said transfer conveyor when in said first position, the lengths of the horizontal conveyor and the space separating it from said transfer conveyor being relatively small in comparison to the length of the boards being cut by said saw.
4. In a board handling assembly having:
  a supporting framework;
  a saw mounted on said framework including double vertical cutting edges;
  a carriage positioned on said framework for reciprocable motion parallel to the saw cutting edges, said carriage being provided with log gripping elements adapted to position a log for cutting engagement with the saw edges during reciprocation of said carriage;

outfeed conveyor means mounted on said framework in a horizontal position in longitudinal alignment with the saw cutting edges immediately below the elevational level of a log mounted on the log gripping elements of said carriage, the infeed end of said outfeed conveyor being longitudinally spaced outward from said saw;

and a roller conveyor mounted on said framework in longitudinal and elevational alignment with said outfeed conveyor, said conveyor extending outwardly from the saw in a direction opposite to said outfeed conveyor, the direction of motion of the top surfaces of said outfeed conveyor and said roller conveyor being identical the improvement comprising:

a movable transfer conveyor mounted on the framework intermediate the outfeed conveyor and the saw, the transfer conveyor having a board supporting surface adapted to be positioned alternately in longitudinal and elevational alignment with the top surfaces of the outfeed conveyor and the roller conveyor or in a transversely offset position wherein the separation of said transfer conveyor and the saw is maintained, the board supporting surface having motion imparted thereto in the same direction as the top surface of the outfeed conveyor when in the first of the preceding alternate positions.

5. An assembly as defined in claim 4 further comprising:

a slat bed conveyor mounted on said framework adjacent said saw and extending toward said transfer conveyor, said slat bed conveyor including a horizontal upper surface located in longitudinal and elevational alignment with the top surfaces of said outfeed conveyor and said roller conveyor, the direction of motion of said slat bed conveyor upper surface being the same as said outfeed conveyor and the longitudinal length thereof being relatively small in comparison to the length of logs on said carrier, the outfeed end of said slat bed conveyor being longitudinally spaced from the transfer conveyor.

6. An assembly as defined in claim 4 further comprising:

a slat bed conveyor mounted on said framework adjacent said saw and extending toward said transfer conveyor, said slat bed conveyor including a horizontal upper surface located in longitudinal and elevational alignment with the top surfaces of said outfeed conveyor and said roller conveyor, the direction of motion of said slat bed conveyor upper surface being the same as said outfeed conveyor and the longitudinal length thereof being relatively small in comparison to the length of logs on said carrier, the outfeed end of said slat bed conveyor being longitudinally spaced from the transfer conveyor;

and a movable member mounted on said framework adjacent the infeed end of said slat bed conveyor adapted to selectively block the passage of cut boards from said roller conveyor to said slat bed conveyor.

References Cited in the file of this patent
UNITED STATES PATENTS 2,374,659     Bassler _____ May 1, 1945

UNITED STATES PATENT OFFICE
CERTIFICATE OF CORRECTION

Patent No. 3,119,419                 January 28, 1964

Wooster Hayden Fisk et al.

It is hereby certified that error appears in the above numbered patent requiring correction and that the said Letters Patent should read as corrected below.

Column 4, line 28, after "immediately" insert -- below --; line 29, for "algiment" read -- alignment --.

Signed and sealed this 23rd day of June 1964.

(SEAL)
Attest:

ERNEST W. SWIDER
Attesting Officer

EDWARD J. BRENNER
                                               Commissioner of Patents